United States Patent
Kim

(10) Patent No.: US 8,057,089 B2
(45) Date of Patent: Nov. 15, 2011

(54) INVERTER COVER SHIELD FOR LIQUID CRYSTAL DISPLAY MODULE

(75) Inventor: Byoung-Chul Kim, Gyeonsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 512 days.

(21) Appl. No.: 11/012,344

(22) Filed: Dec. 16, 2004

(65) Prior Publication Data

US 2005/0243540 A1    Nov. 3, 2005

(30) Foreign Application Priority Data

Apr. 29, 2004 (KR) .................. 10-2004-0029771

(51) Int. Cl.
*F21V 7/04* (2006.01)
(52) U.S. Cl. .............. 362/630; 362/26; 362/633
(58) Field of Classification Search .......... 362/630, 362/360, 561, 612–614, 632–634; 349/58, 349/60, 61, 65, 67, 70
See application file for complete search history.

(56) References Cited

U.S. PATENT DOCUMENTS

| | | | | |
|---|---|---|---|---|
| 6,219,116 B1 * | 4/2001 | Yuuki et al. | ..................... | 349/58 |
| 6,466,282 B2 * | 10/2002 | Sasuga et al. | ................... | 349/58 |
| 6,538,373 B2 * | 3/2003 | Fujimoto | ...................... | 313/493 |
| 6,583,556 B2 * | 6/2003 | Oishi et al. | ................... | 313/495 |
| 6,902,285 B2 * | 6/2005 | Eiraku et al. | .................... | 362/26 |
| 6,979,114 B2 * | 12/2005 | Kao | .............................. | 362/633 |
| 7,202,980 B2 * | 4/2007 | Hayashi | ........................ | 358/475 |
| 2002/0113918 A1 * | 8/2002 | Hiratsuka et al. | .............. | 349/65 |
| 2004/0125268 A1 * | 7/2004 | An | ................................ | 349/58 |

FOREIGN PATENT DOCUMENTS

| | | |
|---|---|---|
| KR | 2003-5660 | 1/2003 |
| KR | 2003-57267 | 7/2003 |

* cited by examiner

*Primary Examiner* — Hargobind S Sawhney
(74) *Attorney, Agent, or Firm* — Morgan, Lewis & Bockius LLP

(57) ABSTRACT

An inverter cover shield device includes a receiving portion for receiving an inverter; a wire guiding portion for guiding at least one internal wire extending from the inverter, the wire guiding portion including a contact portion and a non contact portion, the contact portion supporting the at least one internal wire, and the contact portion being positioned between the non-contact portion and the receiving portion.

7 Claims, 8 Drawing Sheets

INVERTER COVER SHIELD FOR LIQUID CRYSTAL DISPLAY MODULE

The present invention claims the benefit of Korean Patent Application No. 2004-0029771 filed in Korea on Apr. 29, 2004, which is hereby incorporated by reference.

BACKGROUND OF THE INVENTION

1. Field of the Invention

The present invention relates to liquid crystal display module, more particularly, to an inverter cover shield for liquid crystal display module.

2. Description of the Related Art

In general, flat panel displays are increasingly being used for portable devices because they are thin, lightweight, consume low power. Among the various types of flat panel display devices, liquid crystal display (LCD) devices are widely used for laptop computers and desktop monitors because of their superior resolution, and color display quality.

An LCD device uses the optical anisotropy and polarization properties of liquid crystal molecules to produce an image. Liquid crystal molecules have a definite orientation that results from their peculiar characteristics. The specific orientation can be modified by applying an electric field across the liquid crystal molecules. Due to optical anisotropy, the transmissivity of the LCD device to an incident depends upon the orientation of the liquid crystal molecules.

The LCD device has an upper substrate and a lower substrate with electrodes that are spaced apart and face each other. A liquid crystal material is interposed between the upper and the lower substrates. When an electric field is applied to the liquid crystal material due to a voltage across the electrodes corresponding to the upper and lower substrates, respectively, an alignment direction of the liquid crystal molecules is changed in accordance with the applied voltage. By controlling the applied voltage, the LCD device provides various transmittances to rays of light, thereby displaying an image.

The LCD device, however, does not emit the light by itself. The LCD device requires a light source. Usually, a backlight device is positioned behind the LCD panel. Backlight devices are classified into direct backlight type (or direct type) units and edge light type (or edge type) units, depending on the position of a lamp with regard to the LCD panel. With the direct type backlight, incident rays irradiating from the lamp are directly incident on the LCD panel. With the edge type backlight unit, rays from the lamp are incident on the LCD panel via a light guide or a reflector.

Nowadays, the direct type backlight is more common than the edge type backlight. However, since the direct type backlight assembly includes a plurality of lamps behind the LCD panel, the LCD module gets thicker. Therefore, a major issue is to design thinner LCD modules.

FIG. 1 is a cross sectional view of a peripheral portion of a related art LCD module. As shown in FIG. 1, the LCD module includes an LCD panel 100 for displaying images and a backlight assembly that emits artificial light toward the LCD panel 100. A top case 290 surrounds the LCD panel 100 and the backlight assembly and fastens the LCD panel 100 to the backlight assembly.

The backlight assembly mainly consists of lamps 210, a reflector 220, a diffusion sheet 240, a mold frame 280, a lamp supporter 281 and a panel guide 285. The mold frame 280 accommodates and buttresses portions of the backlight assembly. The lamp supporter 281 is located in an inner portion of the mold frame 280 and supports both edges of each lamp 210. The lamps 210 are disposed in parallel with each other underneath the LCD panel 100. The reflector 220 is disposed underneath the lamps 210 and reflects light emitted by the lamps toward the LCD panel 100 to prevent the light loss. The diffusion sheet 240 is located over the lamps 210, and disperses and diffuses the emitted and reflected light. The panel guide 285 is disposed over the diffusion sheet 240 and accommodates the prism sheet 250 and the LCD panel 100.

The LCD module further includes a bottom cover 230 underneath the mold frame 280. The bottom cover 230 protects and shields the lamps 210. An inverter 260 is disposed underneath the bottom cover 230 to supply electric power to the lamps 210 through internal wires 265. A cover shield 270 surrounds the inverter 260 at the bottom of the bottom cover 230 and protects the inverter 260 from external impact. The cover shield 270 and the bottom cover 230 isolate the inverter 260 by embracing and covering the inverter on all sides. The cover shield 270 is made of a metallic material to absorb electromagnetic waves.

As shown in FIG. 1, the cover shield 270 consists of an inner side 271, a bottom side 272 and an outer side 273. The bottom side 272 corresponds to the bottom side of the inverter 260. The inner side 271 is disposed below the bottom cover 230. The outer side 273 corresponds to an outer portion of the bottom cover 230 and bends upward to cover the sidewalls of the bottom cover 230 and mold frame 280. Furthermore, the outer side 273 of the cover shield 270 is in contact with the internal wire 265s extending from the inverter 260 to the lamps 210.

The cover shield 270 may cause a parasitic capacitance in the internal wires 265 because the outer side 273 of the cover shield 270 contacts the internal wires 265. Current may be drawn of the internal wires 265 through the contact with the cover shield 270, thereby generating a current leakage in the internal wires 265. Accordingly, the lamps 210 may not receive enough current. The impedance caused by both the cover shield 270 and the internal wires 265 may be calculated by the following equation:

$$Xc=1/(2\pi fC)$$

where "f" represents a frequency of the alternating current that is flowing through the internal wires 265, and "C" represents the parasitic capacitance generated between the outer side 273 and the internal wires 265. In the above equation, the impedance(Xc) will decrease if the frequency (f) increases or if the parasitic capacitance (C) increases with the contact area between the outer side 273 and the internal wires 265. Therefore, the current leakage will increase when the impedance decreases.

When current leakage increases, the inrush current in lamps 210 will be reduced and the luminance of the light emitted by the lamps 210 will be reduced. To prevent these disadvantages, the related art frequently employs insulating papers or other related appliances between the cover shield 270 and the internal wires 265. However, such insulating papers or related appliances require additional fabrication, thus increasing production cost.

SUMMARY OF THE INVENTION

Accordingly, the present invention is directed to an inverter cover shield module for a liquid crystal display module that substantially obviates one or more of the problems due to limitations and disadvantages of the related art.

An object of the present invention is to provide an inverter cover shield device for maintaining stable images on a liquid crystal display panel.

Another object of the present invention is to provide an inverter cover shield device for achieving a minimum luminance variation on a liquid crystal display panel.

Another object of the present invention is to provide an inverter cover shield device that reduces a parasitic capacitance with internal wires of a liquid crystal display module.

Another object of the present invention is to provide an inverter cover shield device that reduces a current leakage from internal wires of a liquid crystal display module.

Additional features and advantages of the invention will be set forth in the description that follows, and in part will be apparent from that description, or may be learned by practice of the invention. The objectives and other advantages of the invention will be realized and attained by the structure particularly pointed out in the written description and claims hereof as well as shown in the appended drawings.

To achieve these and other advantages and in accordance with the purpose of the present invention, as embodied and broadly described, an inverter cover shield device includes a receiving portion for receiving an inverter; a wire guiding portion for guiding at least one internal wire extending from the inverter, the wire guiding portion including a contact portion and a non contact portion, the contact portion supporting the at least one internal wire, and the contact portion being positioned between the non-contact portion and the receiving portion.

In another aspect, an inverter assembly includes an inverter and an inverter cover shield device. The inverter includes at least one internal wire extending from the inverter. The inverter cover shield device includes a receiving portion for receiving the inverter; a wire guiding portion for guiding the at least one internal wire, the wire guiding portion including a contact portion and a non-contact portion, the contact portion supporting the at least one internal wire, and the contact portion being positioned between the non-contact portion and the receiving portion.

In another aspect, a backlight assembly device for a liquid crystal display module includes at least one lamp for emitting light, at least one reflector for reflecting the light emitted from the lamp, a diffusion sheet between the reflector and the at least one lamp, a bottom cover underneath the reflector, an inverter for applying electric power to the at least one lamp through at least one internal wire, and an inverter cover shield. The inverter cover shield includes a receiving portion for receiving the inverter; a wire guiding portion for guiding the at least one internal wire extending from the inverter, the wire guiding portion including a contact portion and a non-contact portion, the contact portion supporting the at least one internal wire, and the contact portion being positioned between the non-contact portion and the receiving portion.

It is to be understood that both the foregoing general description and the following detailed description are exemplary and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings.

Figure 1:
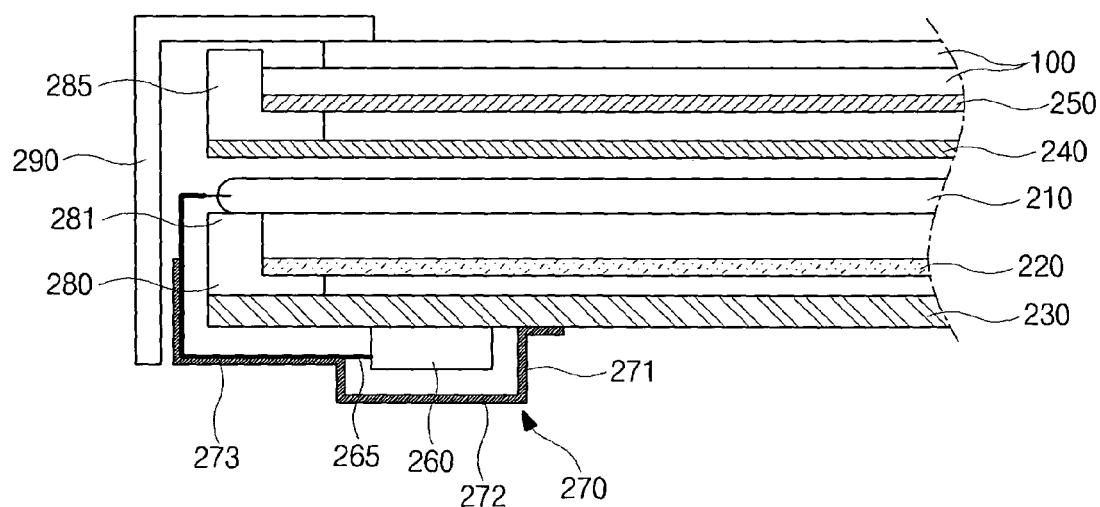
FIG. 1 is a cross sectional view of a peripheral portion of a related art LCD module.
Figure 2:
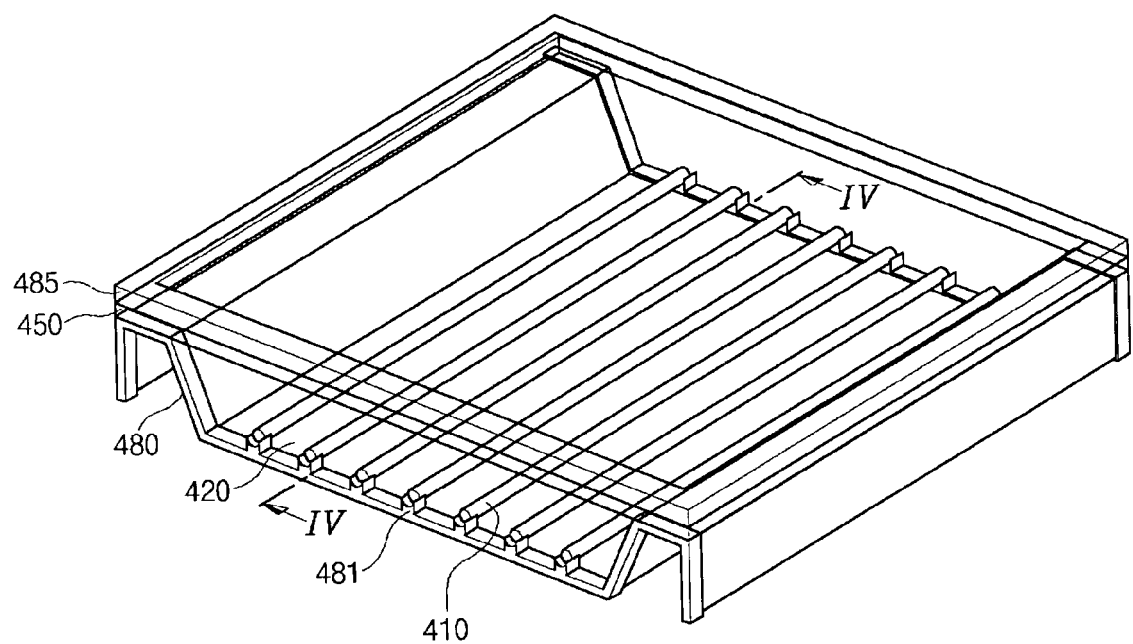
FIG. 2 is a perspective view of a liquid crystal display (LCD) module according to an embodiment of the present invention.

FIG. 2 is a perspective view of a liquid crystal display (LCD) module according to an embodiment of the present invention. Referring to FIG. 2, the LCD module includes an LCD panel 300 (shown in FIG. 3) and a backlight assembly. The LCD panel 300 displays images.

Figure 3:
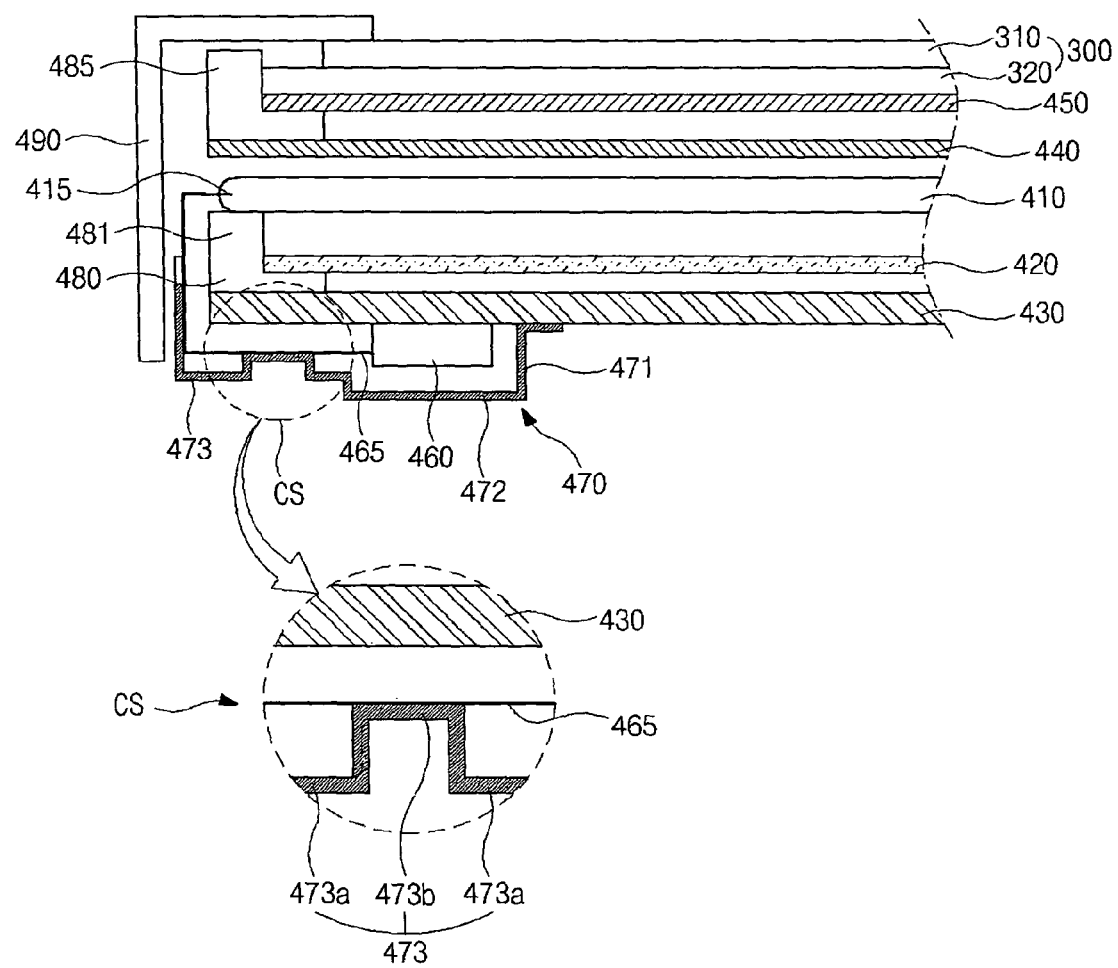
FIG. 3 is a cross sectional view taken along line IV-IV of FIG. 2 and showing an exemplary peripheral portion of the LCD module according to an embodiment of the present invention.

FIG. 3 is a cross sectional view taken along line IV-IV of FIG. 2 and showing an exemplary peripheral portion of the LCD module according to an embodiment of the present invention. Referring to FIG. 3, the LCD panel 300 also includes an upper substrate 310 and a lower substrate 320. A liquid crystal layer (not shown) is provided between the upper and lower substrates 310 and 320.

The backlight assembly emits artificial light toward the LCD panel 300. The backlight assembly includes a plurality of lamps 410, a reflector 420, a diffusion sheet 440, a prism sheet 450, a mold frame 480, a plurality of lamp supporter 481 and a panel guide 485. A top case 490 surrounds the LCD panel 300 and the backlight assembly. The top case 490 fastens the LCD panel 300 to the backlight assembly.

The mold frame 480 accommodates and buttresses portions of the backlight assembly. The lamp supporters 481 are located in an inner peripheral portion of, and at both ends of the mold frame 480. One of the plurality of lamps 410 is supported at its ends by two of the lamp supporters 481. The lamps 410 are disposed underneath the LCD panel 300 and are electrically connected to one another in parallel.

The reflector 420 reflects artificial light emitted from the lamps 410 toward the LCD panel 300. As such, the reflector 420 prevents loss of light. The reflector 420 is disposed underneath the lamp 410 on an inner surface of the mold frame 480.

The diffusion sheet 440 disperses and diffuses light emitted by the lamps 410 and light reflected by the reflector 420. The diffusion sheet 440 is located over the lamp 410. The panel guide 485 is disposed over the diffusion sheet 440 and accommodates the prism sheet 450 and the LCD panel 300.

Figure 4:
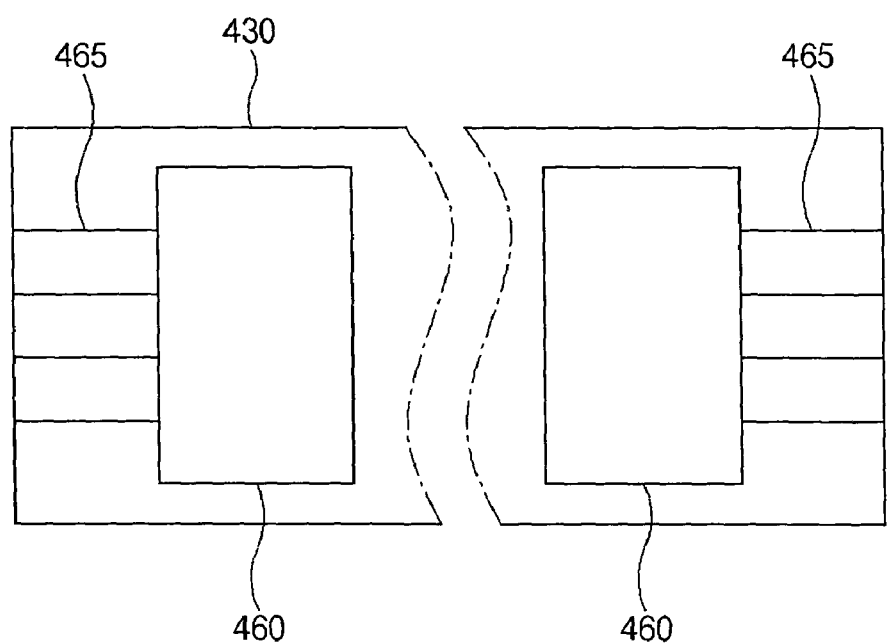
FIG. 4 is a bottom view of an exemplary liquid crystal display module according to an embodiment of the present invention.

FIG. 4 is a bottom view of an exemplary liquid crystal display module according to an embodiment of the present invention. Referring to FIG. 4, the LCD module further includes a bottom cover 430, a plurality of inverters 460, and a plurality of internal wires 465. The bottom cover 430 is located underneath the mold frame 480. The bottom cover 430 protects and shields the lamps 410.

The inverters 460 are disposed underneath the bottom cover 430. The inverters 460 may be disposed at both sides of a bottom surface of the bottom cover 430. In an embodiment of the present invention, one of the inverters applies a high voltage to the lamps 410 (shown in FIG. 3) through the internal wires 465. The other inverter applies a low voltage to the lamps 410 (shown in FIG. 3).

Referring back to FIG. 3, a cover shield 470 surrounds the inverters 460 at the bottom of the bottom cover 430. The cover shield 470 protects the inverters 460 from external impact. The cover shield 470 and the bottom cover 430 isolate the inverters 460 by embracing and covering all sides of the inverter 460. Therefore, the inverter 460 can be protected from the external impact and shock. The cover shield 470 may be made of a metallic material to absorb electromagnetic waves. The bottom cover 430 may also include a metallic material.

The inverters 460 supply electric power to the lamps 410 through the internal wires 465. The internal wires 465 extend from the inverters 460 along a bottom surface of the bottom cover 430. Then, the internal wires 465 bend upward along the mold frame 480 to contact the electrodes 415 of the lamps 410. One of the lamps 410 may be a cold cathode fluorescence lamp (CCFL), which includes electrodes 415 at both ends thereof. When electric power is applied from the inverter 460 to the electrodes 415 through the internal wires 465, the lamp 410 generates and emits artificial light.

As shown in FIG. 3, the cover shield 470 includes an inner side 471, a bottom side 472 and an outer side 473 to cover and protect the inverters 460. The bottom side 472 corresponds to the bottom of one of the inverters 460. The inner side 471 is disposed at the bottom of the bottom cover 430 and is connected to the bottom side 472. The outer side 473 is disposed opposite to the inner side 471 and corresponds to an outer portion of the bottom cover 430. In an embodiment of the present invention, the outer side 473 partially contacts the internal wires 465, thereby guiding the internal wires 465.

As illustrated in an enlarged view of a portion CS in FIG. 3, the outer side 473 includes first portions 473a and second portions 473b. The first portions 473a do not contact internal wires 465. The second portion 473b is indented from the first portions 473a to contact the internal wires 465. The first portions 473a can be referred to as non-contact portions, and the second portion 473b can be referred to as an indentation portion. FIG. 3 shows only one indentation portion 473b. However, a plurality of indentation portions may be provided.

The outer side 473 bends upward to cover the sidewalls of the bottom cover 430 and the mold frame 480. The outer side 473 is formed closer to the bottom cover 430 than the bottom side 472. Accordingly, a distance of the first portions 473a to the bottom cover 430 is shorter than a distance of the bottom side 472 to the bottom cover 430.

Figure 5:
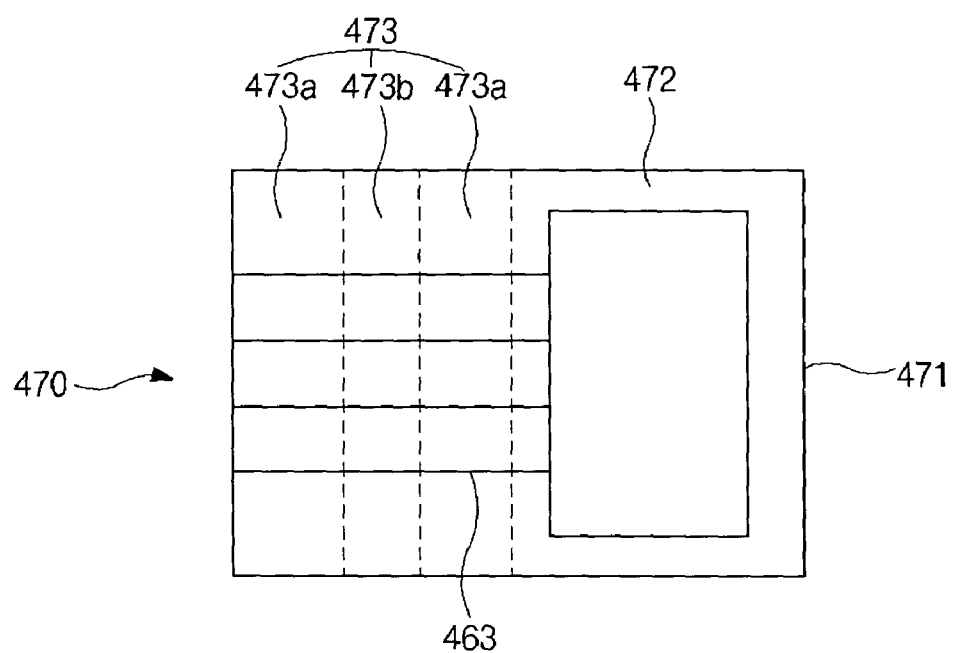
FIG. 5 is a top view of an exemplary cover shield according to an embodiment of the present invention.

FIG. 5 is a top view of an exemplary cover shield according to an embodiment of the present invention. As shown in FIG. 5, the indentation portion 473b is formed in the middle of the outer side 473 of the cover shield 470. The dotted lines shown in FIG. 5 represent folding lines where the cover shield 470 is bent. The inverter 460 (shown in FIG. 3) is located within, preferably in the middle of, the bottom side 472 and is surrounded by the cover shield 470. The internal wires 465 (shown in FIG. 4) extend from the inverters 460.

As described above, only the indentation portion 473b contacts the internal wires 465. Thus, the contact area between the cover shield 470 and the internal wires 465 is substantially reduced in an embodiment of the present invention in comparison to the related art. The non-contact portions 473a of the outer side 473 do not touch the internal wires 465. As a result, a parasitic capacitance that may be generated between the cover shield 470 and the internal wires 465 decreases in accordance with the reduction in the contact area. Moreover, current leakage may also be reduced in comparison to the related art.

Table 1 shows the lamp currents flowing through the lamps 410. The lamp currents are measured relative to a distance between the cover shield 470 and the internal wire 465. The experiments are performed twelve times under the same condition.

TABLE 1

| | | Distance Length (mm) | | | |
|---|---|---|---|---|---|
| | | 0 | 0.8 | 1.5 | Without Cover Shield |
| Current (mA) | Experiment 1 | 5.60 | 5.73 | 5.78 | 5.82 |
| | Experiment 2 | 5.70 | 5.79 | 5.81 | 5.85 |
| | Experiment 3 | 5.69 | 5.74 | 5.78 | 5.81 |
| | Experiment 4 | 5.81 | 5.84 | 5.87 | 5.90 |
| | Experiment 5 | 5.84 | 5.86 | 5.89 | 5.93 |
| | Experiment 6 | 5.79 | 5.81 | 5.82 | 5.87 |
| | Experiment 7 | 5.81 | 5.82 | 5.83 | 5.87 |
| | Experiment 8 | 5.70 | 5.79 | 5.82 | 5.88 |
| | Experiment 9 | 5.74 | 5.80 | 5.81 | 5.83 |
| | Experiment 10 | 5.60 | 5.81 | 5.86 | 5.90 |
| | Experiment 11 | 5.73 | 5.82 | 5.85 | 5.90 |
| | Experiment 12 | 5.73 | 5.81 | 5.83 | 5.87 |
| | Average (mA) | 5.73 | 5.80 | 5.83 | 5.87 |
| | Percent (%) | 97.6 | 98.8 | 99.3 | 100 |

As indicated in TABLE 1, the larger the distance between the cover shield 470 and the internal wires 465, the lower the current leakage. When the distance between the cover shield 470 and the internal wires 465 is 0.8 mm, the flow of current through the lamps 410 has about 98.8% efficiency compared to when the cover shield is not used.

To display stable images on the LCD panel, the luminance of the light emitted from the lamps 410 should have a variation of less than 5%. To satisfy the 5% variation, the lamp current preferably varies by less then 0.1 mA. If the lamps 410 have a luminance of 100% without the cover shield 470, the distance of the cover shield 470 to the internal wires 465 may be greater than 0.5 mm to maintain the luminance variation within 5%. Since the bottom cover 430 includes also a metallic material, the bottom cover 430 can be separated from the internal wires 465 to prevent the occurrence of the parasitic capacitance and the current leakage.

Figure 6:
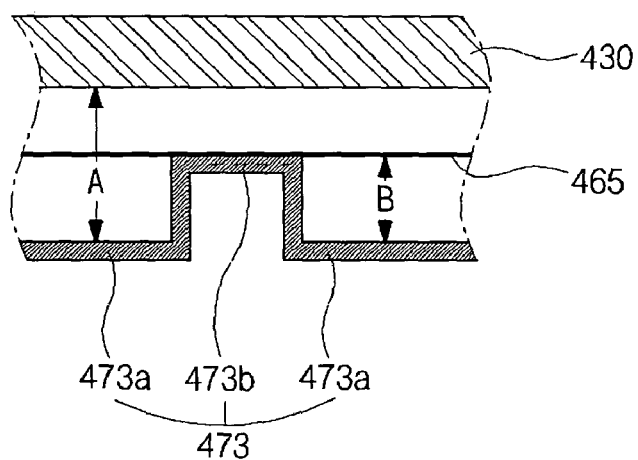
FIG. 6 shows an exemplary contact area between a cover shield and an internal wire according to an embodiment of the present invention.

FIG. 6 shows an exemplary contact area between a cover shield and an internal wire according to an embodiment of the present invention. Referring to FIG. 6, the non-contact portions 473a of the outer side 473 are separated from the internal wires 465 by a distance B. The bottom cover 430 is separated from the non-contact portion 473a by a distance A. If the distance B is equal or greater than a half the distance A (B≧(A/2)), the bottom cover 430 causes an increase of the current leakage. Thus, the non-contact portions 473a and the bottom cover 430 have to be designed to keep distance B less than half of distance A (B<(A/2)). Especially, the distance B of the non-contact portions 473a to the internal wires 465 satisfies the following inequality: 0.5 (mm) <B <A/2. A distance B in this range can efficiently prevent the current leakage.

The contact portions 473a of the bottom cover 430 can be of any shape. For example, the contact portions 473a of the bottom cover 430 can have one of a rectangular shape, a triangular shape, a curved shape, and a semicircular shape. Using any of each of these shapes, the current leakage can be made sufficiently small for a proper functionality of the inverter.

Figure 7A:
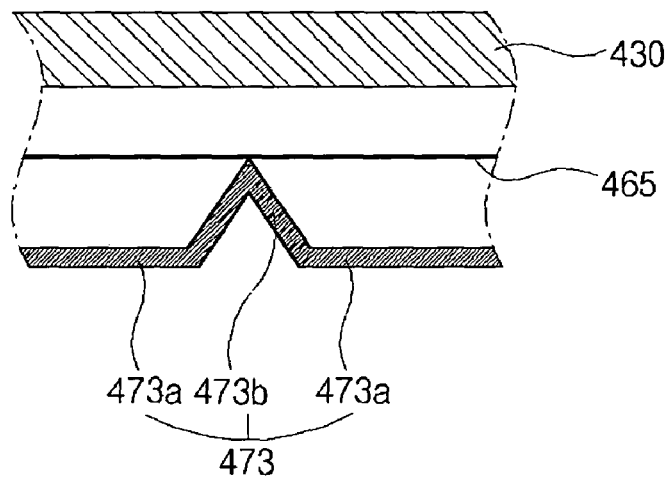
FIG. 7A shows an exemplary cover shield according to another embodiment of the present invention.
Figure 7B:
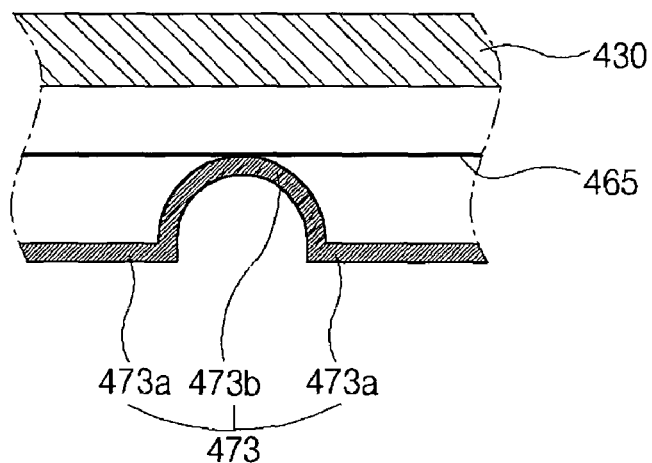
FIG. 7B shows an exemplary cover shield according to yet another embodiment of the present invention.

FIG. 7A shows an exemplary cover shield according to another embodiment of the present invention. FIG. 7B shows an exemplary cover shield according to yet another embodiment of the present invention. Referring to FIG. 7A, the indentation portion 473b of the outer side 473 may have a triangular shape. Referring to FIG. 7B, the indentation portion 473b of the outer side 473 may have a semicircular shape. Accordingly, the indentation portion 473b can have a contact line or a contact point with one of the internal wires 465. Thus, the contact area is reduced to a minimum. Accordingly, the parasitic capacitance and the current leakage are reduced.

According to an embodiment of the present invention, the cover shield 430 can be used in a direct type LCD (direct backlight assembly) or as well in an indirect type LCD (indirect backlight assembly).

According to an embodiment of the present invention, a cover shield is provided with indentation portions in the outer side to decrease a contact area with the internal wires of the backlight assembly. Moreover, the cover shield includes non-contact portions that are separated from the internal wires, thereby reducing parasitic capacitance and current leakage. Thus, the originally supplied lamp inrush current is maintained, and the luminance variation in the lamps is minimized. The backlight assembly of the present invention can emit a stable light and raise the efficiency of the inverter. No insulating papers or other related appliances are required in the LCD module of the present invention. Thus, the production cost can be reduced.

It will be apparent to those skilled in the art that various modifications and variations cab be made in the inverter cover shield for liquid crystal display module of the present invention without departing from the spirit or scope of the invention. Thus, it is intended that the present invention cover the modifications and variations of this invention provided they come within the scope of the appended claims and their equivalents.

What is claimed is:

1. An inverter cover shield device for a liquid crystal display module, the liquid crystal module including a liquid crystal panel, a backlight assembly underneath the liquid crystal panel and including at least one lamp, a bottom cover underneath the backlight assembly, and an inverter underneath the bottom cover and applying electric power to the at least one lamp through at least one internal wire, the inverter cover shield device comprising:
   a receiving portion including an inner side and a bottom side, the receiving portion for accommodating the inverter such that the inverter is disposed between the receiving portion and the bottom cover; and
   a wire guiding portion including an outer side, the wire guiding portion for guiding the at least one internal wire extending from the inverter such that the at least one internal wire is disposed between the wire guiding portion and the bottom cover the wire guiding portion and the receiving portion being a one-piece structure, the wire guiding portion having at least one protruding portion that supports and contacts the at least one internal wire, and at least one indentation portion that is not in contact with the at least one internal wire,
   wherein the inverter cover shield is underneath the bottom cover,
   wherein the receiving portion, the wire guiding portion, the contact portion and the non contact portion are made of metallic material.

2. The inverter cover shield device according to claim 1, wherein the protruding portion extends from the indentation portion towards the internal wire.

3. The inverter cover shield device according to claim 1, wherein the protruding portion includes a polygon shape.

4. The inverter cover shield device according to claim 1, wherein the protruding portion includes one of a rectangular shape and a triangular shape.

5. The inverter cover shield device according to claim 1, wherein the protruding portion includes a curved shape.

6. The inverter cover shield device according to claim 1, wherein the protruding portion includes a semicircular shape.

7. The inverter cover shield device according to claim 1, wherein a distance from the indentation portion to the at least one internal wire is greater than about 0.5 mm.

* * * * *